United States Patent [19]

Schinkitz et al.

[11] Patent Number: 5,334,362
[45] Date of Patent: Aug. 2, 1994

[54] PROCESS FOR THE PRODUCTION OF DISPOSABLE PRODUCTS FROM METAL CHLORIDES IN A TITANIUM DIOXIDE CHLORIDE PROCESS

[75] Inventors: Dieter Schinkitz; Hans Thumm, both of Leverkusen, Fed. Rep. of Germany

[73] Assignee: Kronos, Inc., Hightstown, N.J.

[21] Appl. No.: 948,636

[22] Filed: Sep. 23, 1992

[30] Foreign Application Priority Data

Sep. 23, 1991 [DE] Fed. Rep. of Germany ....... 4131577

[51] Int. Cl.⁵ .............................................. C01G 23/07
[52] U.S. Cl. .......................................... 423/1; 423/55; 423/66; 423/74; 423/85; 423/127; 423/140
[58] Field of Search .................... 423/1, 55, 66, 74, 85, 423/140, 127

[56] References Cited

U.S. PATENT DOCUMENTS

| | | | |
|---|---|---|---|
| 3,655,344 | 4/1972 | Mitchell et al. | 23/299 |
| 3,754,072 | 8/1973 | Sato et al. | 423/66 |
| 4,579,721 | 4/1986 | Friedman | 423/66 |
| 5,271,910 | 12/1993 | van der Meer et al. | 423/55 |

*Primary Examiner*—Wayne Langel
*Attorney, Agent, or Firm*—Michael J. Cronin

[57] ABSTRACT

In order to treat metal chlorides obtained in the form of dust collector solids in the production of titanium dioxide by the chloride process, the inert constituents, especially particulate coke, is separated then the metals are selectively precipitated and a maturing phase under oxidative conditions is provided for. The residue consisting of metal hydroxides is also not thixotropic in the absence of inerts. As a result, the material to be deposited has been cut in half.

16 Claims, No Drawings

PROCESS FOR THE PRODUCTION OF DISPOSABLE PRODUCTS FROM METAL CHLORIDES IN A TITANIUM DIOXIDE CHLORIDE PROCESS

BACKGROUND AND SUMMARY OF THE INVENTION

The present invention relates to a process for disposable work-up of metal chlorides which accrue as cyclone dust in preparation of titanium dioxide via the chloride process, and, more particularly, to a process for treating the metal chlorides through pasting up of the cyclone dust in water and/or an acid to dissolve the metal chlorides, separation of the inert components of the cyclone dust from the suspension in a first separation step, selective precipitation of the metals as metal hydroxides via a gradual increase of the pH in the filtrate of the suspension to a value below 12, separation of the precipitated metal hydroxides in a second separation step, and work up of the precipitated metal hydroxides into disposable filter cakes.

In the commercial manufacture of titanium tetrachloride, a titanium containing ore, e.g. ilmenite, slag, synthetic rutile or natural rutile is chlorinated in the presence of coke as a reducing agent in a fluid bed reactor at temperatures of around 1000° C. as described in U.S. Pat. No. 4,961,911. Besides the desired reaction product, namely titanium tetrachloride, the impurities contained in the ore are also continuously chlorinated, with the formation of especially iron (II) chloride (but not iron (III) chloride). Besides titanium tetrachloride, the material leaving the reactor contains higher boiling metal chlorides, low boiling components, such as carbon monoxide, carbon dioxide, carbon oxysulfide, hydrogen chloride and inert solid materials, especially coke powder as well as silicon dioxide and titanium dioxide.

The high boiling chlorides are condensed by cooling and, together with the inert solids, are separated from the gas stream in a cyclone separator. The product accruing in the cyclone is called "cyclone dust" in the following description. The designation "residual" or "waste chloride" can also be used to describe the accrued product.

The cyclone dust is further treated with well known processes. One such process involves pasting up and filtration. The filtrate of the suspension (essentially a solution containing iron (II) chloride) is, for example, suitable for sludge conditioning in waste water treatment and is, therefore, a marketable product. The coke-containing filtration residue is disposable or is useful as, for example, a fuel. Another such known further treatment process involves pasting up, neutralization and filtration. All metal chlorides are converted into a solid, water-insoluble form as hydroxides and, together with the inert materials, a disposable, well filterable, non-thixotropic filter cake is obtained as discussed in U.S. Pat. No. 3,655,344). Yet another further treatment process involves dry neutralization and pelletizing as discussed, for example, in DE 27 36 622 A1. On account of today's very strict requirements for disposal of waste materials, however, such a process is not practical.

A process for selective work up of the metal chlorides is described in EP 390 293 A1, in which the metal chlorides brought into solution are separated in a first step from the inert constituents and then metal hydroxides are selectively precipitated from the separated solution through addition of basic medium in the pH range of 3.5–4, with subsequent separation and drying. This known process does not take into account, however, a serious problem has not been carefully considered, namely the precipitated and worked up metal hydroxides obtained from the suspension without inert materials are thixotropic and thus cannot be deposited in a garbage dump.

An object of the present invention is to overcome the problems associated with the known processes by finding a process for the work up of the cyclone dust in which the inert components are separated and the metal chlorides are brought into a form which permits disposal.

The foregoing object has been achieved by selective precipitation so that the pH of the filtrate of the suspension will go above 5.0 only after addition of an oxidizing agent in the pH range of 4.2 to 5.

A special advantage in using the process according to the present invention is that the inert constituents of the cyclone dust for production of a disposable product are not required so as to considerably reduce the quantity of accrued filter cake. This is a great advantage, not only in the confines of the dump area but, also because the inert materials can be introduced into other chemical processes as valuable materials. Moreover, the filter cake accruing in the process is not thixotropic and is, therefore, disposable.

The critical point in the process of the present invention appears to be a partial oxidation of the divalent iron with simultaneous "ripening" of the filtrate of the suspension under special conditions. Thereafter, by increasing the pH, all metal hydroxides are precipitated and converted into a form which permits large scale disposal. It further appears that, with waiting or during the oxidation, the hydroxides of aluminum, titanium, chromium, vanadium, zirconium and niobium, which are otherwise filterable with difficulty and all are already formed at a pH of $\leq 4.5$, so ripen that later in the adjustment of the filtrate of the suspension to a pH range to 10, a large quantity, above all of iron hydroxide, is precipitated on the already formed hydroxides. As an apparent consequence, even without the inert components, coke, titanium dioxide and silicon dioxide, a well filterable, non-thixotropic solid material is obtained.

According to an advantageous processing method according to the present invention, the suspension is to be so diluted further that the iron content is under 20 g/l.

In the oxidation treatment in the pH range between 4 and 5, introduction of air is especially preferred. Per cubic meter of suspension of 20 $Nm^3$, air is introduced in a time interval of 10 to 100 minutes as an order of magnitude.

DETAILED DESCRIPTION OF THE INVENTION

In the following example, the process of the present invention is further described and compared to known processes.

A cyclone dust, which accrues in the operation of a chlorination reactor with slag as raw material, has the following composition (the quantities are based on 1 t titanium dioxide):

241 kg iron (II) chloride
137 kg chlorides of manganese, aluminum, vanadium, zirconium, chromium, niobium, titanium, magnesium, calcium
115 kg coke
18 kg silicon dioxide
56 kg titanium dioxide 0.66 tons of this cyclone dust are pasted up in 1 m³ acidified water; the pH is below 1. Such a suspension is the starting point for the following three processing methods (I–III), of which Processes I and II are conventionally known processes.

Process I (Conventional)

The original suspension is diluted in a ratio of 1:1 with additional acidified waste waters accruing in the process and brought to a pH of 10 by lime solution. The hydroxides formed are separated on a filterpress together with the inert ingredients.

Process II (Conventional)

The inert components are separated from the original acidified suspension by a membrane filterpress, and the filtrate of the suspension is diluted in a ratio of about 1:1. After that the metal chlorides are precipitated as hydroxides through the addition of lime. They accrue in very finely divided form. There are considerable problems in the filtration. Moreover, the filtration residue is thixotropic and not disposable.

Process III (Present Invention)

The inert components are separated as in Process II. If the filtrate of the suspension is now handled in accordance with the present invention, the separated solid materials are no longer thixotropic but disposable. Characteristically for the process of the present invention, the ripening time under oxidative conditions is in a pH range below 5. In the batch-wise experiments, several hundred Nm³ of air are injected into approximately 20 m³ of filtrate of the suspension in approximately one hour. The following table gives particulars about the individual process parameters. The portion of the dry substance in the filter cake in Process III is, to be sure, somewhat lower than in Process I. The filter cake can, however, be taken to a dump without inert portions. About 40% less dumping space is required if the inert components do not have to be included in the dumping. In addition, the process is more economical because the valuable materials of the inert components of the cyclone dust can be returned into the chloride process or advantageously used in other processes.

| Process Parameters in the Oxidative Ripening | I | II | III Variants | | | |
|---|---|---|---|---|---|---|
| | | | 1 | 2 | 3 | 4 |
| Dilution of the Filtrate of the Suspension to an Iron Content (g/l) | 27.7 | 22.0 | 22.0 | 20.5 | 21.3 | 20.0 |
| Quantity of Filtrate of Suspension (m³) | | | 21.5 | 21.0 | 21.4 | 20.0 |
| pH Prior to Oxidation | | | 4.5 | 4.9 | 4.7 | 4.6 |
| Air Introduced (Nm³/h) | | | 350 | 380 | 400 | 410 |
| Retention Time (h) | | | 1.0 | 1.5 | 1.0 | 1.5 |
| Temperature (°C.) | | | 40 | 40 | 40 | 40 |
| Fraction $Fe^{+3}$ after oxidation based on Fe total in % | | | 11 | 14 | 16 | 19 |
| pH at end of Precipitation | 9.5 | 10.0 | 10.1 | 10.2 | 10.4 | 10.4 |
| Filter Cake: Quantity (kg/t $TiO_2$) | 1031 | 900 | 600 | 595 | 590 | 587 |
| Dry Substance (wt. %) | 46.5 | 26.5 | 37.7 | 38.4 | 38.6 | 39.0 |
| Chloride Content in the Filter Cake (wt. %) | 4.0 | 4.6 | 4.0 | 3.9 | 3.7 | 3.6 |
| State of the Filter Cake | solid | thixotropic | solid | solid | solid | solid |
| Suitability for Disposal | suitable | unsuitable | suitable | suitable | suitable | suitable |

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A process for treating metal chlorides obtained in a form of dust collector solids in production of titanium dioxide by the chloride process, to render said metal chloride dumpable, comprising the steps of
   slurrying the dust collector solids in at least one member selected from the group consisting of water and acid to dissolve said metal chlorides,
   separating inert constituents of the dust collector solids from the slurry,
   selectively precipitating metals as metal hydroxides by gradually increasing the pH in the slurry filtrate with a pH value of 5 up to pH values below 12 only after adding an oxidizing agent in a pH range of about 4.2 to 5,
   and making the precipitated metal hydroxides into non-thixotropic filter cake disposable in an environmentally sound waste facility.

2. The process according to claim 1, wherein a retention time is maintained before the pH value of 5 of the slurry filtrate is increased.

3. The process according to claim 2, wherein the time is between 10 and 100 minutes.

4. The process according to claim 1, wherein the oxidizing agent is air.

5. The process according to claim 4, wherein a retention time is maintained before the pH value of 5 of the slurry filtrate is increased.

6. The process according to claim 5, wherein the retention time is between 10 and 100 minutes.

7. The process according to claim 2, wherein the temperature of the slurry filtrate is at least 40° C. during the retention time.

8. The process according to claim 7, wherein the retention time is between 10 and 100 minutes.

9. The process according to claim 8, wherein the oxidizing agent is air.

10. The process according to claim 1, wherein the slurry filtrate is diluted to reach an iron concentration of less than 20 g/l.

11. The process according to claim 10, wherein a retention time is maintained before the pH value of 5 of the slurry filtrate is increased.

12. The process according to claim 11, wherein the retention time is between 10 and 100 minutes.

13. The process according to claim 11, wherein the oxidizing agent is air.

14. The process according to claim 13, wherein the temperature of the slurry filtrate is at least 40° C. during the retention time.

15. The process according to claim 14, wherein the retention time is between 10 and 100 minutes.

16. The process according to claim 15, wherein the oxidizing agent is air.

* * * * *